UNITED STATES PATENT OFFICE.

THOMAS C. MEADOWS, OF NEW YORK, N. Y.

FERTILIZER.

1,304,082.      Specification of Letters Patent.      Patented May 20, 1919.

No Drawing.      Application filed June 15, 1918. Serial No. 240,185.

*To all whom it may concern:*

Be it known that I, THOMAS C. MEADOWS, a citizen of the United States, residing at New York, in the county of New York and State of New York, have invented new and useful Improvements in Fertilizers, of which the following is a specification.

This invention relates to a new and useful fertilizer which will not only supply many essential plant food constituents to the soil, but will also render very light and non-cohesive ones water retaining, and increase their tilth. In addition it will supply calcium in a form more beneficial for agricultural purposes than quicklime or carbonate of calcium.

The object of this invention is to provide a product which may be simply obtained, easy to handle and will improve the physical condition of the soil, while neutralizing any acidity, and will provide necessary constituents for plant life. With this and other objects in view the invention consists in the novel materials and type of materials constituting the product, all as will be more fully hereinafter disclosed and particularly pointed out in the claims.

In carrying out this invention the fertilizer may be applied directly to the soil alone or associated with other plant foods.

This fertilizer material results from the treatment of greensand and lime under pressure and may be applied directly to the soil before the removal of any potassium compounds or after a very considerable proportion has been abstracted by lixiviation.

A peculiar property possessed by raw greensand and not lessened by the lime digestion to which it is subjected is its ability to retain water. In fact the digested product dries only on prolonged exposure to the sun, and the material lying in heaps retains its moisture indefinitely. This feature is of importance in the case of light and sandy soils which, largely from their lack of humus, dry out rapidly. In other words this fertilizer increases the moisture-retaining properties of a soil.

It is well known that the application of lime to soils, either as such or as a carbonate, is always beneficial, and absolutely essential where there is a perceptible acidity. The material, which forms the subject of the present invention, not only replaces these, but from its peculiar method of formation is capable of producing better results.

The lime on uniting with the greensand under pressure in presence of steam and water produces a particularly active hydrous material of a more or less basic character and one easily attacked by plants. In addition there is present, when the former has been added in excess, a peculiar plastic sub-hydrate of calcium which is chemically very active. This sub-hydrate and its method of formation is more fully described in U. S. Patent 1,235,766 August 7th, 1917.

It is not to be supposed that the production of this fertilizing material is confined to lime-greensand digestions. It may just as easily result from similar treatments in which equivalent materials are employed or any combination of materials that will produce the same fertilizer.

In the ordinary applications of lime to soils its caustic nature necessitates care in its application to avoid damaging crops if added during the growing season. It is also liable to destroy bacterial life which is so necessary for the successful growing of maximum crops.

It is true this danger can be avoided by using limestone or marl, but the action is so slow, that it is generally thought advisable to use caustic lime.

My greensand-lime-digestion fertilizer overcomes these objections as it supplies a sub-hydrate of calcium which is very active chemically, without exhibiting any of the characteristics of ordinary caustic lime which is so destructive to organic life.

The resulting sludge from the digestion may be applied to the soil as such or be evaporated. On the other hand, a preferable way is to remove the larger portion of the soluble potassium compounds by filtration and washing. In this way, the high grade potassium compounds are recovered.

The most important plant foods, *i. e.*, the potassium compounds, are uniformly distributed throughout the fertilizer and are protected from excessive leaching action of the ground waters. On the other hand they are easily available to the plants, as the rootlets penetrate the moist active mass of hydrous silicate and sub-hydrate of calcium.

If desired the whole of the potassium compounds may be allowed to go with the mass as a fertilizer or only a part of them, the major portion being washed out and sold as high grade potassium compounds, particularly the hydrate.

There is little doubt that the organic matter present in the original greensand and not destroyed by the lime digestion plays an important part. Although present in amounts equal to not more than 1 to 2% its action is such as would be expected from a much larger percentage. It seems to possess accentuated humic properties without being subject to the rapid oxidation of normal humus. It improves the physical properties of the soil, and at the same time is more or less permanent.

In the claims I have referred to the "intensively hydrated condition" of the fertilizer. This is intended to describe a condition which exists in materials digested with water under elevated temperatures and pressures, and which may be described as a uniform distribution of the moisture in a highly plastic mass. One indication of this condition is the peculiar striations noticeable on breaking a wet cake.

Its plant food constitutents may be advantageously augmented by adding to the mass, such well known plant foods as nitrate of sodium, sulfate and muriate of ammonium, superphosphate, cyanamid, etc.

It is a recognized fact that lime liberates the potash in soils. In the present invention I employ an especially active form of lime, so that not only the added potash is rendered available but also much of that previously found in the insoluble state in the soils.

It is obvious that those skilled in the art may vary the composition as well as the application of the fertilizer without in any way departing from the spirit of the invention. Therefore, I do not wish to be limited to the above disclosures except as may be required by the claims.

I claim:—

1. As a new fertilizer, a mass of hydrous calcium iron silicate; sub-hydrate of calcium and soluble and insoluble potassium salts; substantially as described.

2. As a new fertilizer a mass of hydrous calcium iron silicate; sub-hydrate of calcium; soluble potassium salts and a small percentage of organic matter; substantially as described.

3. As a new fertilizer a plastic water-retaining mass of hydrous calcium iron silicate; sub-hydrate of calcium; soluble potassium salts; and organic matter; substantially as described.

4. As a new fertilizer a plastic mass of hydrous calcium iron silicate, a neutralizing but non-destructive hydrate of calcium; and soluble potassium salts; substantially as described.

5. As a new fertilizer a plastic mass of hydrous calcium iron silicate, a readily available neutralizing but non-destructive hydrate of calcium; and soluble potassium salts; substantially as described.

6. As a new fertilizer an infusion of alkali metal compounds in a plastic and intensively hydrated mass of calcium iron silicate; substantially as described.

7. As a new fertilizer a washed plastic mass of calcium iron silicate; a readily available neutralizing but non-destructive hydrate of calcium and water soluble and insoluble potassium compounds; substantially as described.

THOMAS C. MEADOWS.